US006282775B1

(12) United States Patent
Barrett

(10) Patent No.: US 6,282,775 B1
(45) Date of Patent: Sep. 4, 2001

(54) METHODS FOR INJECTING STATOR WINDING COIL GROUPS INTO A STATOR CORE

(75) Inventor: Eugene Richard Barrett, Columbia City, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/010,723

(22) Filed: Jan. 22, 1998

Related U.S. Application Data

(62) Division of application No. 08/517,251, filed on Aug. 21, 1995, now Pat. No. 5,802,706.

(51) Int. Cl.[7] .................................................. H02K 15/06
(52) U.S. Cl. ................................................ 29/596; 29/736
(58) Field of Search ............................... 29/596, 736, 732, 29/734

(56) References Cited

U.S. PATENT DOCUMENTS

| 3,885,288 | * | 5/1975 | Lund ........................................ 29/736 |
| 3,949,464 | * | 4/1976 | Walker .................................. 29/736 X |
| 4,276,689 | * | 7/1981 | Urick et al. ......................... 29/736 X |

FOREIGN PATENT DOCUMENTS

0655035 * 3/1979 (SU) ........................................ 29/736

* cited by examiner

Primary Examiner—Carl E. Hall
(74) Attorney, Agent, or Firm—Carl B. Horton, Esq.; Damian Wasserbauer, Esq.; Armstrong Teasdale, LLP

(57) ABSTRACT

An apparatus for injecting a plurality of coil groups into a stator core of a dynamoelectric machine is described. The injection apparatus includes, in one embodiment, a stripper assembly including a first stripper. The first stripper includes an injection disk which, in one embodiment, is formed from nylon. A first surface of the injection disk is configured to contact a segment of at least one of the coils to move the coil axially along the blades of the injection apparatus without contacting portions of the coil in gaps between the blades.

10 Claims, 8 Drawing Sheets

METHODS FOR INJECTING STATOR WINDING COIL GROUPS INTO A STATOR CORE

CROSS REFERENCE TO RELATED APPLICATIONS

This application is a division of Ser. No. 08/517,251, filed Aug. 21, 1995 now U.S. Pat. No. 5,802,706 issued Sept. 8, 1998.

FIELD OF THE INVENTION

This invention relates generally to stators for dynamoelectric machines and, more particularly, to methods and apparatus for injecting stator winding coil groups into the slots of a magnetic core.

BACKGROUND OF THE INVENTION

The stator of a dynamoelectric machine such as an electric motor or generator typically includes a core of magnetic material having an axially extending bore for receiving a rotor. The core typically is formed from a plurality of identical laminations which are aligned and arranged in a stack held together by clips. Each lamination includes a plurality of teeth which extend radially into the bore. Slots between each of the teeth extend radially outwardly from the bore. The ends of the teeth and the open ends of the slots define the periphery of the bore.

A plurality of coils formed from insulated conductive wire are inserted into selected core slots with portions of the coils at the ends of the core forming end turn regions. The coils are interconnected to form coil groups or poles. The conductive wires which form the coils, sometimes referred to as stator windings, typically are coated with a varnish or an enamel so that a tough protective coating is formed around each wire. The coating is required so that each wire is well insulated from the other wires. Improvements to or reduction of damage to such coating facilitates improved motor performance by, for example, reducing field failures.

To insert the coils into the stator core slots, it is known to form coil groups with coil forms, locate the coil groups on coil insertion (or injection) tooling, and then move the coil groups from the coil insertion tooling to a stator with portions thereof located in stator slots. Coil injection apparatus for inserting the coils into the stator slots is described, for example, in U.S. Pat. No. 3,949,464. Known tooling for such apparatus typically include a base having a plurality of radially arranged and spaced blades extending from an upper surface of the base. The blades are arranged in a circular array.

With known apparatus, a "stripper" having fins is placed within the bore defined by the circular array of blades. The stripper fins are aligned with and extend into the gaps between adjacent blades. One stripper fin extends into each such gap. The stripper includes an upper, or operative, surface configured to contact segments of the coils which lie within the gaps between adjacent blades and extend into the interior, or bore, established by the circular array of blades. A lower surface of the stripper is connected to an axially movable ram, or pusher rod, which extends through the apparatus base and moves the stripper axially along the bore of the circular array of blades. The stripper typically is constructed of a material such as brass.

A single speed motor typically includes coil groups which establish at least one main winding and an auxiliary or start winding. The coil groups are formed with a winding machine and located on the tooling of coil insertion tooling so that the coil groups are located in gaps between the blades at a location between the stripper and the free ends of the blades. Portions of each coil extend through gaps between the blades and segments of each coil span an interior region of the bore established by the circular array of blades. A stator core is then aligned with and placed on the tooling of the coil injection apparatus or device so that at the open end of the circular array of blades, each blade registers with a stator tooth and so that gaps between adjacent blades register with stator slot openings. The pusher rod then moves the stripper within the circular array of blades and from a retracted position toward the stator core. The fins of the stripper contact the portions of the coils which lie in the gaps between adjacent blades. Also, the surface of the stripper facing the core contacts the segments of the coils which span along the interior of the circular array of blades. Once the stripper contacts the coLls as described above, and as the stripper moves toward the stator core, the stripper forces the coils to move along the blades toward the stator core.

As the stripper begins to move through the bore of the stator core, each fin of the stripper which contacts a coil portion in the blade gaps forces such coil portion into respective aligned stator slots. When the upper surface of the stripper has fully moved through the stator bore, each such coil portion is fully injected into the stator core slots. The stripper is then retracted to a retracted position and the "injected" stator core is removed from the insertion device.

When injecting two coil groups, e.g., main and auxiliary (or start) coil groups, into a stator core, at least a portion of at least the lowermost coil group on the blades directly contacts the fins of the stripper. Typically, some portions of the uppermost coil group also are in direct contact with some of the fins. During the injection process, the stripper fins exert sufficient forces against such coil portions to move the coils axially along the blades and to inject side turn portions thereof into the stator slots. Such forces generally have a sufficient magnitude to not only move the coils along the blades and into the stator slots, but also are sufficient to cause stretching and abrading of the magnet wire which forms the coils.

Such deformations sometimes are referred to as pressure marks. Pressure marks are particularly troublesome because over time, as the wire insulation wears, the insulation may fail and conductor material may be exposed. Such exposure may lead to a field failure of the motor. Also, if the magnetic wire is sufficiently deformed or stretched, there may be reduced operational efficiency for the motor due, for example, to increased resistance of the magnet wire and possibly even short circuiting of the wire.

With respect to known strippers, such strippers generally are constructed from a soft metal such as brass in an attempt to limit the damage to insulation and pressure marks on the coils caused during the coil injection process. Manufacturing brass strippers is, of course, expensive in terms of both the material and labor. In addition, the brass fins of the stripper usually must be polished at regular intervals to remove nicks and prevent sharp insulation piercing edges from forming. Polishing such strippers, of course, is time consuming and expensive. Further, the fins of a stripper are susceptible to damage if, for example, the stripper is dropped. If a stripper is dropped, a fin may chip or even break-off. Such a damaged stripper may have to be discarded.

In addition, with known strippers, as the number of windings forming the coil groups being injected increases, the likelihood of coil binding, or "lock-up", also increases. Also, the windings which form the coils may be twisted during the injection process or may get caught between the stripper and one or more of the circular array of blades. When this occurs, the stripper may become locked and axial movement of the stripper may be prevented. Usually, the chance of lock-up is reduced by limiting the number of coils injected in one-pass of the stripper through the rotor bore. Thus, the likelihood of occurrence of a lock-up condition with known strippers can be reduced with this technique.

When using the stripper and one-pass process described above to inject three or more coil groups into a stator core, the forces exerted by the stripper against the coil wires are very high. As a result, the coil wires may be significantly damaged. In addition, although it is highly desirable in some motor applications, e.g., when the effect of inductive reactance is significant, to have the start winding coil group as close as possible to the stator bore to facilitate magnetic coupling between the fields generated by the start winding and rotor, the start winding coil wire and insulation usually cannot withstand the direct high forces which must be exerted against the start winding by the stripper fins in such one-pass injection process. The start winding wire and insulation, for example, usually is much thinner than the main winding wire and insulation. The start coils, therefore, preferable would be located on an injection device so that the fins of the stripper do not directly contact such coils, i.e., the stripper proximate coils which are in direct contact with the fins of the stripper preferably would be main winding coils. As a result, the start winding coils usually are, after placement in the stator core slots, either located at a distance remote from the bore, i.e., at the closed slot ends, or at an intermediate slot location between two main windings.

To avoid the formation of excessive pressure marks and reduce the possibility of a lock-up condition when injecting three or more coil groups into a stator core, a two-pass injection process typically is utilized. For example, a first main coil group and an auxiliary coil group are injected into the stator core in a first pass. A second main coil group is then injected into the stator core in a second pass. Such a two-pass coil injection process enables use of lower forces as compared to the magnitude of forces required for a one-pass injection of three coil groups using known strippers. Even though lower forces are used in the two-pass injection process, such lower forces are still sufficient to create pressure marks on the coil wires. Of course, even higher forces would have to be used to inject three coil groups in one pass, and such higher forces inevitably seem to cause unacceptable damage to the coil wires.

Although a two-pass process is effective for reducing damage to the coil wires, such two-pass process is more labor intensive and time consuming than known one-pass processes used for single speed motors. By reducing the labor and time required for injecting more than two coil groups into stator cores, manufacturing costs for such stators could be reduced.

Known attempts have been made to perform one-pass coil injection of three or more coil groups with complex shaped strippers. The forces necessary to inject the coils using known complex shaped strippers, however, are believed to be high which, as explained above, can result in the stripper fins forming pressure marks on the coil wires. Also, complex shaped strippers are believed to be expensive to manufacture and maintain.

Another known attempt at such one-pass injection has utilized a structure in which two brass strippers were stacked, one on top of the other, within the circular array of blades. A post separated the strippers. The lowermost stripper utilized a 4-leg star which, as described hereinafter, separated the main coil group and the start coil group to reduce the forces which the start coil wires exerted against the main coil wires during the injection process. However, with this approach, it is believed that the forces necessary to inject the coils with such a structure would be objectionably high. Also, two brass strippers must be manufactured and maintained. As explained above, the manufacture and maintenance of such brass strippers is expensive.

When using a two stripper device, the start and main winding coil groups are first loaded over the pre-positioned lowermost stripper. The upper stripper is then inserted within the bore of the circular array of blades, with the stripper fins extending into gaps between adjacent blades, and lowered to rest on the upwardly extending post of the lowermost stripper. The turns of the second main coil group are then loaded into the blade gaps above the fins of the upper stripper.

Although it is desirable to fully automate the coil injection process, known automation equipment cannot consistently operate within the small dimensional tolerances required for aligning stripper fins with gaps between adjacent blades. Therefore, when using a two stripper process, a human operator must perform the task of aligning the upper stripper so that each stripper fin extends into a gap between adjacent blades and initially placing the upper stripper into the tooling. Any such human performed functions, of course, inevitably increase process costs and decrease process speed.

Accordingly, it would be desirable and advantageous to provide a equipment for placing, in one-pass, coils on a stator core of a multi-speed motor, and to provide a stripper that exerts, against the coil wires, forces less than the forces exerted by known strippers. It would also be desirable and advantageous to provide such a stripper which is low in cost, both for manufacture and maintenance, and which eliminates a need for a human operator to orient the stripper within the circular array of blades of the injection device during the manufacturing process.

An object of the present invention is to provide a stripper for placing, in one-pass, winding coils on a stator for a multiple speed motor.

Another object of the present invention is to provide a stripper which is low cost and does not have any significant maintenance requirements or costs.

Still another object of the invention is to provide a stripper which injects the winding coils into a stator core for a multi-speed motor by exerting significantly lower forces against the coil wires as compared to the forces exerted against the coil wires by known strippers.

Yet another object of the present invention is to provide an improved stripper and process which facilitates full automation of magnet wire coil injection processes.

SUMMARY OF THE INVENTION

These and other objects may be attained with methods and apparatus for injecting, in one pass, multiple coil groups into the stator slots of a stalor core. The apparatus, in one embodiment, may include a first stripper without wire damaging fins, one example of which is a nylon injection disk. A grip member, which also may be constructed from nylon, extends from and perpendicular to the core facing, or operative, planar surface of the injection disk. The grip member includes a post and a handle. A weight extends from a bottom planar surface of the injection disk. The weight preferably has a frusto-conical shape and may be constructed from a fairly dense material such as cold rolled steel. The length of the weight member may vary. In some applications, such depth may be selected to be the same as the column height of a following stator winding group to be injected into a following stator core by a second, lower stripper.

The first stripper may be used in connection with known strippers and injection devices in many different configurations. For example, in one combination, the first stripper may be stacked on a second stripper. The second stripper may, for example, be a stripper such as the stripper described in U.S. Pat. No. 3,845,548, which is assigned to the present assignee. More particularly, the second stripper may have a generally disk-like shape with fins formed at its outer periphery and sized to fit in gaps between adjacent blades of the injection tooling. A push rod is connected to a lower surface of the second stripper.

In one form of operation, and in one particular injection process for injecting a four pole auxiliary, or start, winding, a four pole main winding, and a six pole main winding, the second stripper initially is, retracted within the injection tooling. A four leg star preferably is located in the operative face of the second stripper.

An auxiliary winding group may then be loaded onto the blades or tooling so that segments of the auxiliary coils which span across the interior of the circular array of blades also span the operative face or surface of the second stripper. The six pole main winding group coils may then be loaded onto the tooling. The side turns of the coils of the six pole main winding group are angularly and axially displaced from the side turns of the coils of the auxiliary coil group so that at least some of the coils occupy different blade gaps.

After the auxiliary coil group and six pole main coil group are loaded onto the circular array of blades as described above, the first stripper will be moved into the tooling interior so that a central axis of the stripper is substantially coaxial with the axis of the bore, and so that the lower surface of the weight member rests on the second stripper. The working disk of the first stripper will be axially spaced from the coils of the auxiliary coil group and six pole main coil group. The four pole main coil group then will be loaded onto the tooling above the first stripper.

After the coil groups have been loaded onto the injection tooling, the tooling and a stator core are relatively aligned so that each blade of the tooling registers with a stator tooth. The push rod then exerts a force directly against the second stripper and forces both the first and second strippers toward the stator core. As the first stripper moves axially within the tooling toward the stator core, the upper surface of the first stripper contacts the segments of the four pole coil group which span across the interior of the tooling. The first stripper then forces such coil group to move along the blades toward the stator core. As the first stripper moves axially through the bore of the stator, the four pole coil segments are forced into the stator slots aligned with the gaps wherein the segments were originally confined. The first stripper is pushed completely through the stator bore so that the four pole coil group is fully injected into the stator slots.

The wire segments of the four pole coils trapped in the gaps between adjacent blades are not engaged by any wire or insulation damaging stripper fins during the injection process.

As the first stripper is pushed through the tooling, the four leg star follows and contacts the segments of the six pole main coil group located within the tooling bore, and the following surface of the second stripper contacts the segments of the auxiliary coil group located within the tooling bore. The stripper fins of the first stripper also contact and push wire segments of the six pole coil group and the auxiliary coil group that are trapped in the gaps between adjacent tooling blades. The second stripper and star move the auxiliary coil group and six pole main coil group toward the stator core and into the stator slots as the star and second stripper move through the stator bore.

As a result of the operations described above, the four pole main coil group is positioned within the stator slots at a location furthest away from the stator bore, i.e., adjacent the closed ends of the stator slots. The auxiliary winding coil group is radially positioned within the slots at a location closest to, or adjacent to, the slot openings at the stator bore. The six pole main coil group is radially positioned at an intermediate slot radial location between the outer four pole main coil group and the inner auxiliary coil group.

An injection process as described above is a one-pass coil injection process for injecting, for example, multiple coil groups into a stator core for a multiple speed motor. This may be performed using significantly lower forces. As a result, the number and extent of pressure marks formed on the coil wires are believed to be significantly reduced. Also, since the first stripper is sans fins, the possibility of lock-up of wires in the tooling gaps is believed to be significantly reduced.

Moreover, the auxiliary coil group can withstand the direct forces exerted by the second stripper, including the second stripper fins, without being significantly damaged because the insertion forces associated with the first stripper are not transmitted through the wire in the auxiliary coil groups. Thus, the magnitude of such forces is low enough so that the relatively thin auxiliary coil wires and insulation are not significantly damaged by making direct contact with the stripper fins. By using such low forces, the auxiliary coil groups can be positioned adjacent the stator bore, which in turn provides operational advantages as explained above.

In embodiments in which the first stripper comprises an injection disk made of nylon, the first stripper is relatively inexpensive to manufacture as compared to the manufacturing cost associated with known brass strippers. Also, when the coil contacting portion of the first stripper is an injection disk formed of nylon, the maintenance costs for such stripper are greatly reduced. Moreover, it appears that a nylon injection disk is actually more rugged than known finned brass strippers. Further, it will be appreciated by those skilled in the art that since the first stripper can be placed within the circular array of blades with literally any angular orientation relative to the tooling, an automated robotic arm may be used to place the first stripper within the tooling. As explained above, such automated handling is not believed possible with known strippers having fins.

DETAILED DESCRIPTION

Figure 1A:
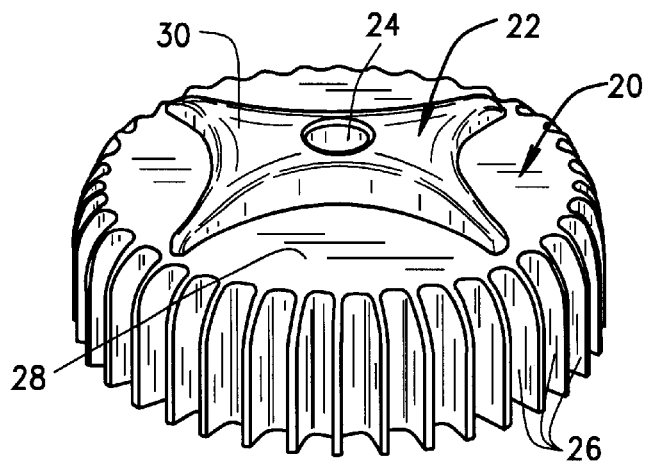
FIGS. 1A and 1B are perspective and plan views, respectively, of a known stripper and a known four leg star.

FIG. 1A is a perspective view of a known stripper having a known four leg star 22 secured thereto by a bolt 24. Stripper 20 has a generally circular shape with fins 26 formed at its outer periphery. A first, or operative, surface 28 of stripper 20 and a first, or operative, surface 30 of star 22 contact stator windings placed on the injection tool blades (not shown) during an injection process. Fins 26 extend into the gaps between adjacent blades of the circular array of blades of the not shown injection device.

Figure 1B:
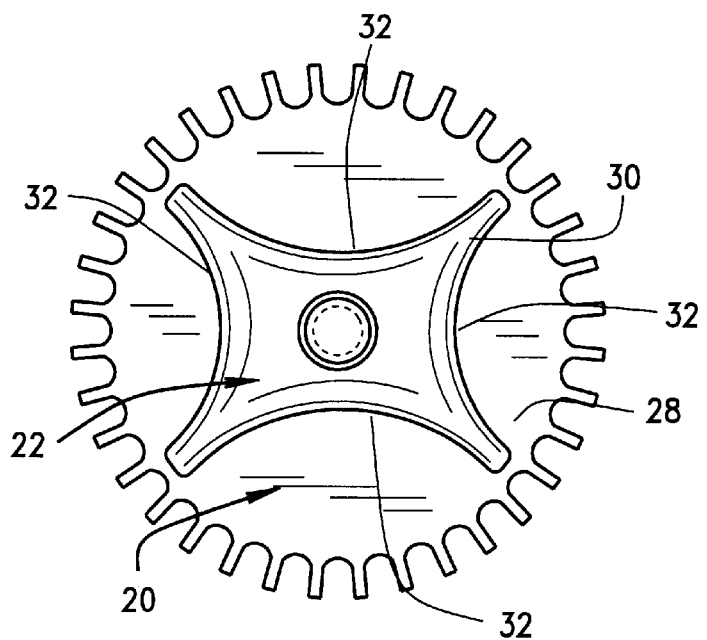

As best shown in FIG. 1B, concave portions 32 of star 22 define regions of surface 28 of stripper 20 which make direct contact with a first coil group during the injection process. First surface 30 of star 22 contacts portions of a second coil group during the injection process.

Figure 4:
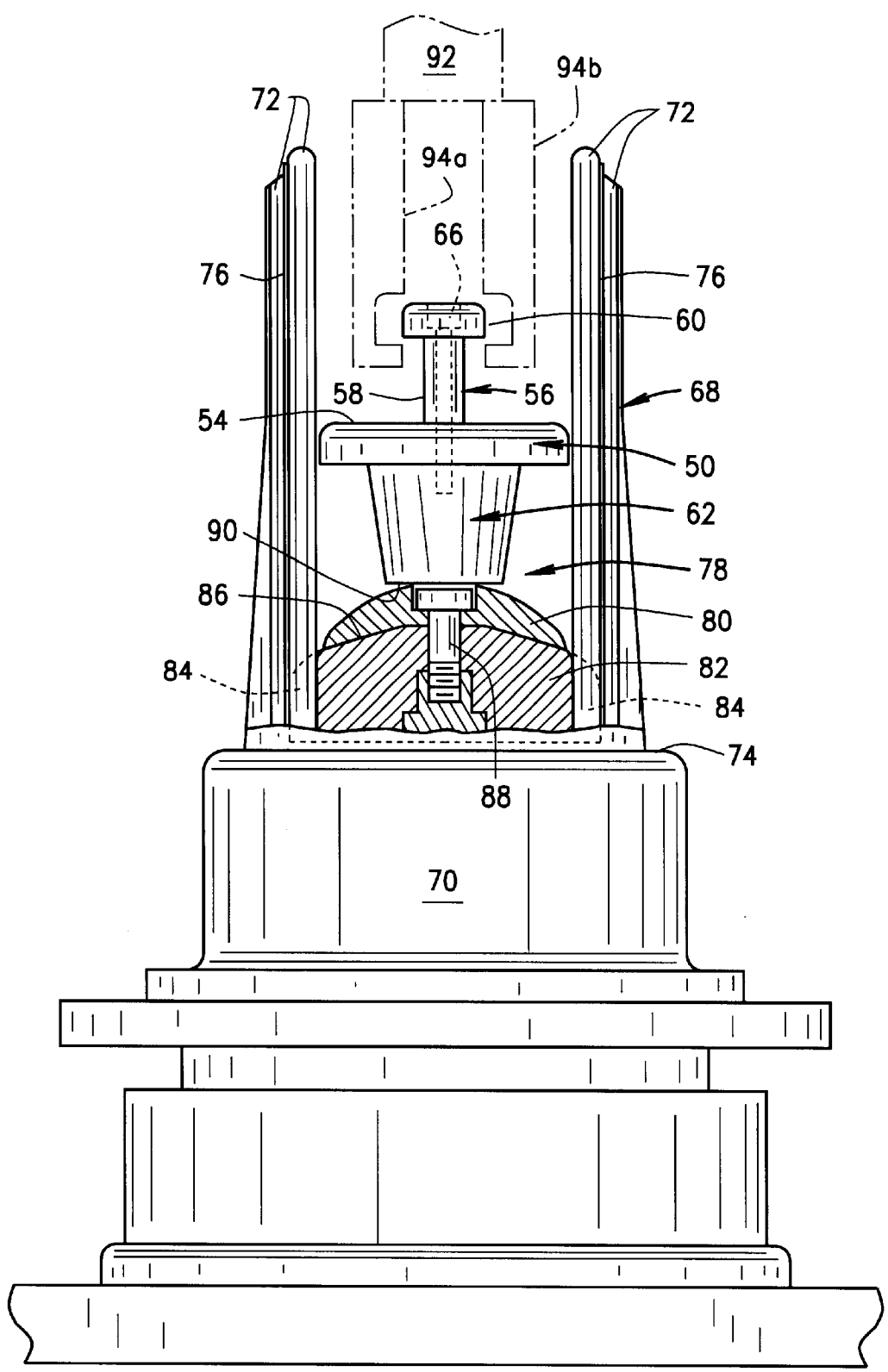
FIG. 4 is an elevation, with parts removed and broken away, of coil injection apparatus embodying aspects of the invention.

When stripper 20 and star 22 are used to inject a four pole main winding coil group and a four pole start winding coil group into a stator core, stripper 20 and star 22 initially are located in a retracted position in the lower part of the circular array of blades of injection tooling as suggested by FIG. 4. The coil groups are produced with winding equipment and placed on blades of coil insertion equipment such that the windings of the coil groups are located on blades at a location axially above stripper 20 and star 22 (as suggested in FIGS. 5 and 6). Typically the lowermost coil group is the four pole start coil group and the uppermost coil group is the four pole main coil group. Portions of each coil extend through gaps between the blades and segments of each coil extend or span across an interior region of the circular array of blades that form the coil injection tooling.

A stator core (see FIG. 10) is then aligned with and placed on the injection tooling so that each blade registers with a stator tooth and gaps between adjacent blades register with stator slots between adjacent stator teeth. To inject the coils, a push rod moves stripper 20 and star 22 in a direction to push the side turns of the coil groups into the stator slots.

Fins 26 of stripper 20 are provided to contact the side turn portions of the coils of the coil groups that lie in the gaps between adjacent blades. Also, the regions of stripper surface 28 defined by concave portions 32 of star 22 contact the segments of the coils of the start coil group which lie within the interior of the circular array of blades. First surface 30 of star 22 contacts the segments of the coils of the main coil group which lie in the interior of the circular array of blades. When stripper 20 and star 22 contact the coils as described above, and as the stripper and star continue to move, the stripper and star force the coils to move along the blade gaps toward the stator core.

As stripper 20 begins to move through the stator bore of the stator core, fins 26 of stripper 22 continue to contact coil portions in the blade gaps and force such coil portions into stator slots. When the coil portions are fully injected into the stator core, stripper 20 and star 22 are retracted and the "loaded" or "wound" stator core is removed from the tooling.

Figure 1C:
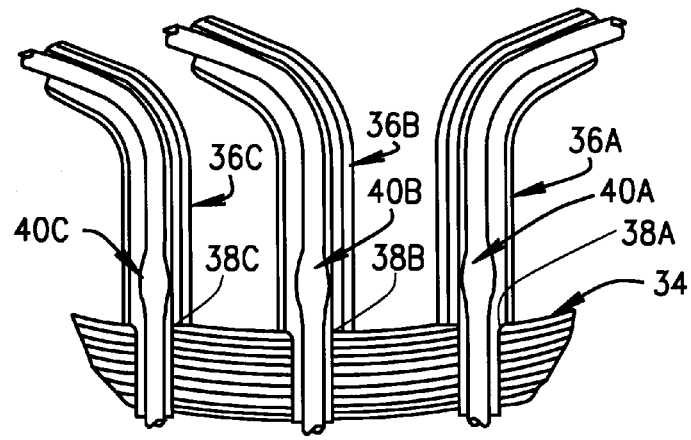
FIG. 1C is a perspective view of a section of a stator bore.

FIG. 1C illustrates a stator core 34 having portions of magnet wires 36A, 36B and 36C injected into slots 38A, 38B, and 38C, respectively. Pressure marks, such as the marks generally indicated at 40A, 40B and 40C, are believed to be formed in or established on magnet wires 36A, 36B and 36C by fins 26 of stripper 20. It should be understood, of course, that different operating conditions and strippers may create pressure marks having other appearances.

Figure 2A:
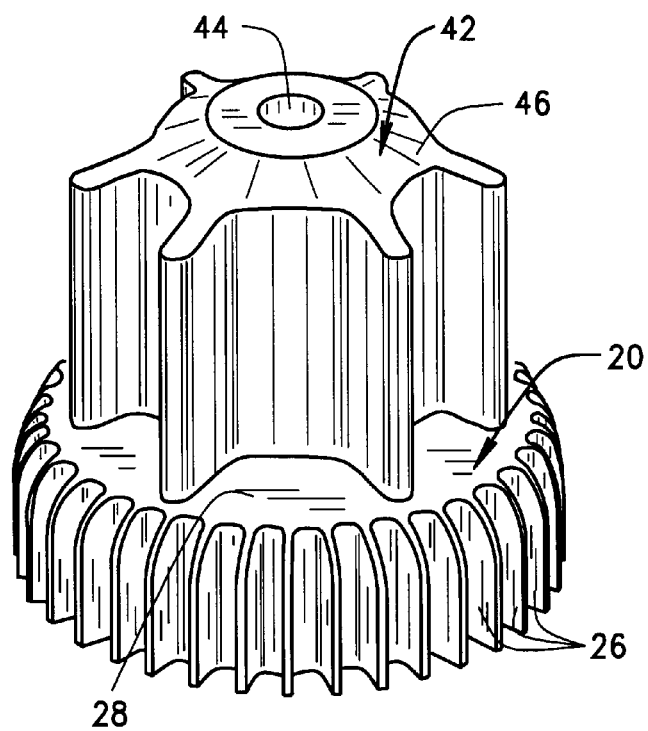
FIGS. 2A and 2B are perspective and plan views, respectively, of the stripper shown in FIGS. 1A and 1B with a known six leg star.
Figure 2B:
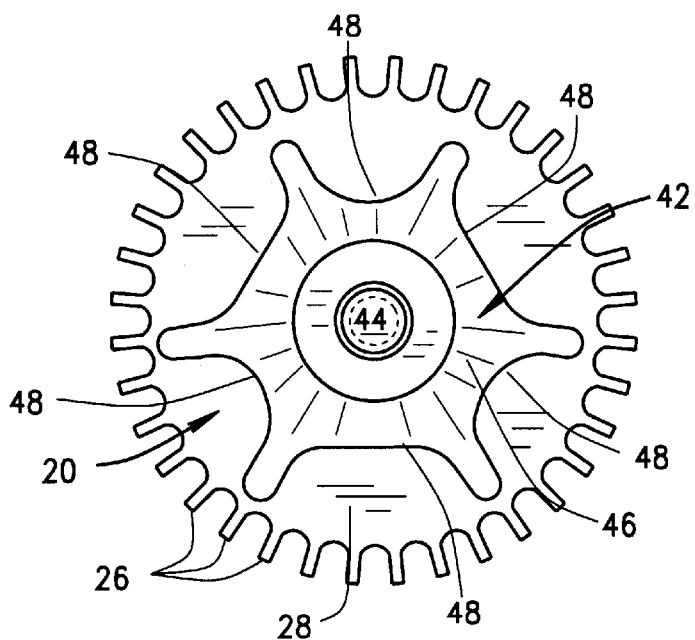

FIG. 2A is a perspective view of stripper 20 having a known six leg star 42 secured thereto by a bolt 44. Six leg star 42 includes a first surface 46 which contacts segments of a coil group during the coil injection process. FIG. 2B is a top plan view of stripper 20 and six leg star 34. As best shown in FIG. 2B, six leg star 42 includes concave portions 48. Concave portions 48 define areas of first surface 28 of stripper 20 which make direct contact with a coil group during the coil injection process.

Four leg star 22 illustrated in FIGS. 1A and 1B is utilized when a coil group having four coils is the last coil group to be injected, in the one-pass, into the stator slots. Six leg star 38, on the other hand, is utilized when the last coil group to be injected, by stripper 20 has six coils.

Stripper 20 with star 22 or 34 have been widely used for injecting coils into stator cores for single speed motors. Typically, and as explained above, two coil groups are injected, in one-pass, using stripper 20 and four leg star 22 or six leg star 42. Although pressure marks seems to be invariably formed on the wires of the coil groups during such injection, the number and extent of such pressure marks and the wire damage associated therewith usually are within acceptable limits.

Attempts have been made to use stripper 20 and star 22 for injecting, in one-pass, three or more coil groups into a stator core for a multiple speed motor. The forces required to inject such coil groups into the stator slots, however, are extremely high and result in unacceptable damage to the windings. As a result, a two-pass injection process, as described above, typically is utilized for injection of more than two coil groups.

Figure 3:
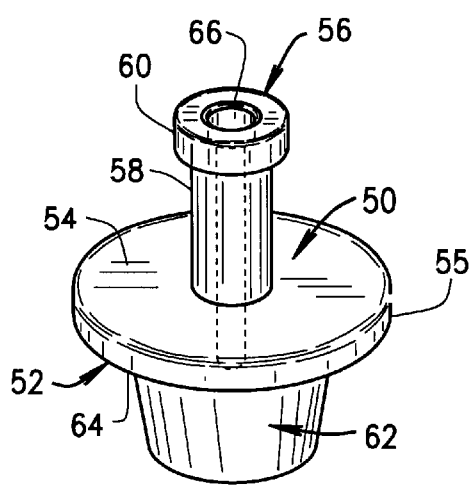
FIG. 3 is a perspective view of one embodiment of a stripper useful in carrying out my invention in a preferred form.

Stripper 50 shown in FIG. 3 overcomes many of the disadvantages and shortcomings of known strippers, particularly with respect to one-pass injection of more than two coil groups into the stator slots of a stator core. Stripper 50 includes an injection disk 52 having a first operative surface 54 that defines a continuous curved injection shoulder 55 around its outer perimeter. A handle 56 extends from surface 54 and includes a post 58 and a grip member 60. A weight member 62 extends from a second surface 64 of disk 52. Weight member 62 may be in many geometric shapes but is shown with a generally frusto-conical shape.

Disk 52 and handle 56 may be constructed of any suitable material such as, for example, plastic, brass, wood, metal, etc. Disk 52 preferably, although perhaps not necessarily, is formed of a material which is softer than the insulation of the magnet wire to be injected by disk 52. In the preferred embodiment, disk 52 and. handle 56 are made of nylon and machined using a lathe. Disk 52 and handle 56 could, alternatively be formed using a molding process. Weight member 62 may have many other shapes and may be constructed of many materials. In the preferred embodiment, weight member 62 is formed from cold rolled steel. Handle 56 and weight member 62 are attached to disk 52 by a bolt 66 which extends through aligned openings in handle 56, disk 52, and weight member 62. Alternatively, an adhesive could be used to form such attachment.

In FIG. 4, a coil injection device 68, with some parts cut away, is illustrated. Device 68 includes a lower housing member 70. Coil injection tooling in the form of elongated blades 72 extend from the upper part 74 of housing 70. Blades 72 are formed in a circular array. Gaps 76 are defined between adjacent blades 72. Further details regarding device 68 are set forth, for example, in U.S. Pat. No. 3,949,464, the entire disclosure of which is incorporated herein by reference. In FIG. 4, some blades 72 are cut away in order to better illustrate a stripper assembly 78. Also, no coil groups are shown in FIG. 4.

Stripper assembly 78 includes first stripper 50. In the preferred embodiment, the clearance or tolerance between the outer periphery of disk 54 of first stripper 50 and the inner periphery of the circular array of blades 72 preferable is no greater than approximately one-half the diameter of the smallest diameter wire which will be injected by first stripper 50.

Stripper assembly 78 includes a four leg star 80 and a second stripper 82. Four leg star 80 and second stripper 82 are identical to stripper 20 and star 22 illustrated in FIGS. 1A and 1B. It will be seen that second stripper 82 includes fins 84 which extend into gaps 76 between adjacent blades 72. Second stripper 82 also includes a first operative surface 86. Star 80 and second stripper 82 are secured to each other by bolt 88. A second lower surface 90 of weight member 62 rests on star 80. A spacer (not shown) could be positioned between star 80 and weight member 62.

A gripper 92, shown in phantom, forms part of an automated pick and place machine (not shown). Gripper 92 includes first and second arms 94A and 94B, respectively. Arms 94A and 94B are configured to grip the grip-member 60 of handle 56, as hereinafter described in more detail.

Figure 5:
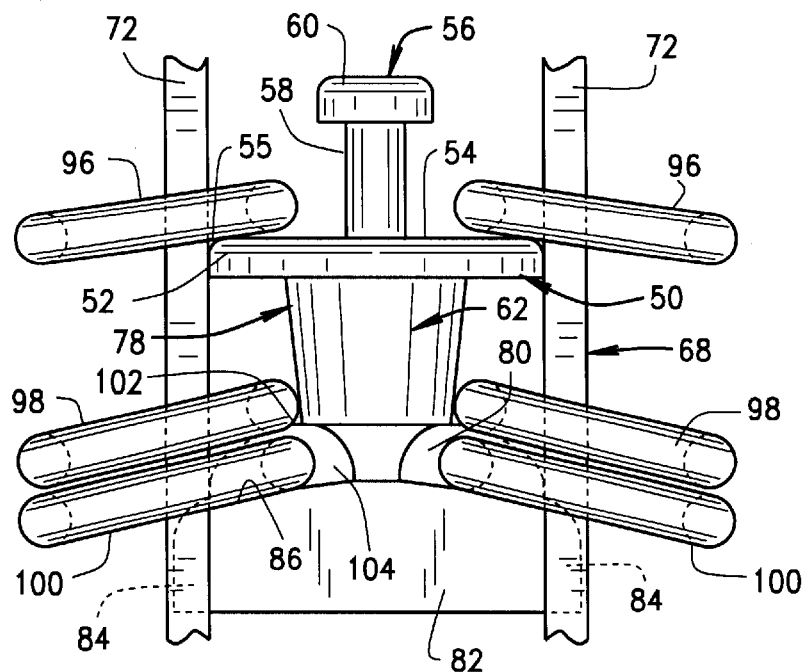
FIG. 5, is a schematic representation of parts of apparatus and motor windings and includes a retracted stripper with a four leg star, and three coil groups.

FIG. 5 is useful in explaining the process of injecting coil groups with coil assembly 78 and device 68, and shows first, second and third coil groups 96, 98, and 100 loaded on blades 72 of device 68. First coil group 96 is positioned adjacent first surface 54 of first stripper 50. Second coil group 98 is positioned adjacent a first surface 102 of four leg star 80. Third coil group 100 is positioned adjacent the regions of first surface 86 of second stripper 82 defined by concave portions 104 of star 80. The first coil group 96, may have four main winding coils, the second coil group 98 may have six main winding coils, and the third coil group 100 may have four start, or auxiliary, winding coils.

It will be understood by those skilled in the art and viewing FIG. 5, that the third coil group 100 is first loaded onto blades 72 so that segments of the coils of third group 100 extend or span across the interior of the circular array of blades 72. Such segments also are either nested into or aligned for contact with upper, or operative, surface 86 of second stripper 82.

Second coil group 98 is then loaded onto blades 72. The coils of second group 98 are angularly and axially displaced from the coils of third group 100. Typically, the blade gaps occupied by third coil group 100 are not occupied by the second (or first) coil group 98 (or 96) and vice versa. Segments of the coils of second group 98 extend or span across the interior of the circular array of blades 72. Such segments also are aligned for contact with upper surface 102 of star 80.

After third coil group 100 and second coil group 98 are loaded onto the circular array of blades 72 as described above, first stripper 50 is lowered into the circular array of blades 72 so that the vertical axis of nylon injection disk 52 is substantially coaxial with the vertical axis of the circular array of blades 72. Weight member 62 of first stripper 50 rests on upper surface 102 of four leg star 80. Injection disk 52 of first stripper 50 is axially above the coils of coil groups 98 and 100. First coil group 96 is then loaded onto the free ends of blades 72.

In order to inject coil groups 96, 98 and 100 into a stator core (not shown), a stator core is aligned with the injection device 68 so that each blade 72 registers with a stator tooth and the gaps 76 register with stator slots. A push rod (not shown) extends through housing member 70 and couples to second stripper 82, and forces stripper assembly 78 in a direction to place coil group 96 on the stator core. As first stripper 50 moves axially within the blades 72, shoulder 55 and surface 54 of disk 52 contacts the segments of first coil group 96 which extend and span across the interior of the circular array of blades 72. Injection disk 50 forces first coil group 96 to move along blades 72 towards the stator core.

Injection disk 52 does not physically contact those portions of the coils of first coil group 96 which lie in the gaps 76 of adjacent blades 72. As injection disk 52 moves through the rotor bore of the stator core, the coil portions of first coil group 96 in gaps 76 are forced into the respective aligned stator slots. Injection disk 52 of first stripper 50 is pushed completely through the stator bore so that first coil group 96 is fully injected into the stator slots.

As first stripper 50 moves along the array of blades 72 as described above, four leg star 80 and second stripper 82 also move along the blades. Four leg star 80 moves the segments of second coil group 98 and upper surface 86 of second stripper 82 moves the segments of third coil group 100. Fins 84 of second stripper 82 contact and move the portions of second and third coil groups 98 and 100 which lie in the gaps 76. Second stripper 82 and star 80 cause second and third coil groups 98 and 100 to move axially along blades 72 toward the stator core. Second and third coil groups 98 and 100 are injected into the stator slots as star 80 and second stripper 82 move through the rotor bore.

As a result of the injection operation described above, first main coil group 96 is positioned on the stator core, within the stator slots at a radial location furthest away from the rotor bore, i.e., at the stator slot bottom or closed end. Third coil group 100 will be positioned within the stator slots at a location radially closest to, or adjacent to, the stator bore. Second coil group 98 is positioned within the stator slots at an intermediate location between first main coil group 96 and third coil group 100.

The one-pass coil group injection process described above may be performed using significantly lower forces at least as compared to the forces required with a particular known injection stripper assembly. Because of such lower forces, the number and extent of pressure marks formed on the coil wires because of fins 84 may be significantly reduced. Also, since injection disk 52 does not have any fins, not only are pressure marks virtually eliminated, but the possibility of lock-up between injection disk 52 and the coils of first main coil group 96 injected by such disk 52 is believed to be significantly reduced, if not eliminated entirely.

A somewhat surprising and unexpected advantage also results because of the significantly lower forces that are used. The advantage is that the third coil group 100 can be the start winding coil group since the threat to wire damage caused by excessive injection forces has been overcome. Particularly, as described above, third coil group 100 is positioned within the stator slots at a radial location closest to, or adjacent to, the stator bore. Positioning the start winding coils adjacent the rotor bore provides certain operational advantages as discussed above. Since only low forces are required to inject such coil groups, the wire and insulation forming the start winding coils can withstand the direct forces exerted during single pass injection by second stripper 82, including second stripper fins 84, without being significantly damaged.

Further, when injection disk 52 is constructed of nylon, disk 52 is relatively inexpensive to manufacture as compared to the manufacturing cost associated with known brass strippers. Also, maintenance costs for such injection disk 52 are reduced, and a nylon injection disk seems to be unexpectedly longer lived and more rugged as compared to brass stripper 20 having fins 26.

Star 80, of course, does not necessarily have to be used in connection with stripper assembly 78. For example, six leg star 34 illustrated in FIGS. 2A and B could be used in place of four leg star 80. Moreover, as shown in FIG. 6, no star could be used.

Figure 6:
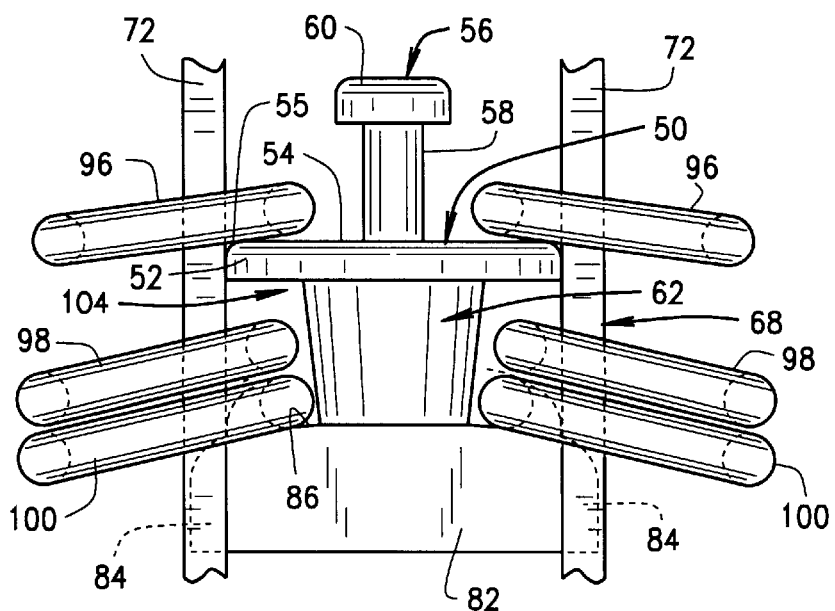
FIG. 6 is a view similar to FIG. 5 but of a stripper wherein the star has been omitted.

FIG. 6 illustrates a coil injection assembly 104 which includes first stripper 50 and second stripper 82. As compared to assembly 78 illustrated in FIG. 5, in assembly 104, four leg star 80 has been removed. A spacer (not shown) could be positioned between weight member 62 and stripper 82. With assembly 104, second coil group 98 rests on third coil group 100 rather than being separated from third coil group 100 by star 80. This configuration can be used in some injection processes where it is acceptable to have third coil group 100 assert some additional forces against second coil group 98 during the coil injection process.

With the various configurations discussed above, since first stripper 50 can be placed at any angular orientation within the bore defined by the circular array of blades 72, an automated robotic arm can be used to place first stripper 50 within the bore. As explained above, and with known strippers having fins, such automated placement is not believed to have been possible heretofore. First stripper 50, however, does not have fins and does not have to be oriented within the circular array of blades at any particular angular orientation. Use of first stripper 50, therefore, enables full automation of a coil injection process utilizing double strippers, even when injecting more than two coils into a stator core.

Figure 7:
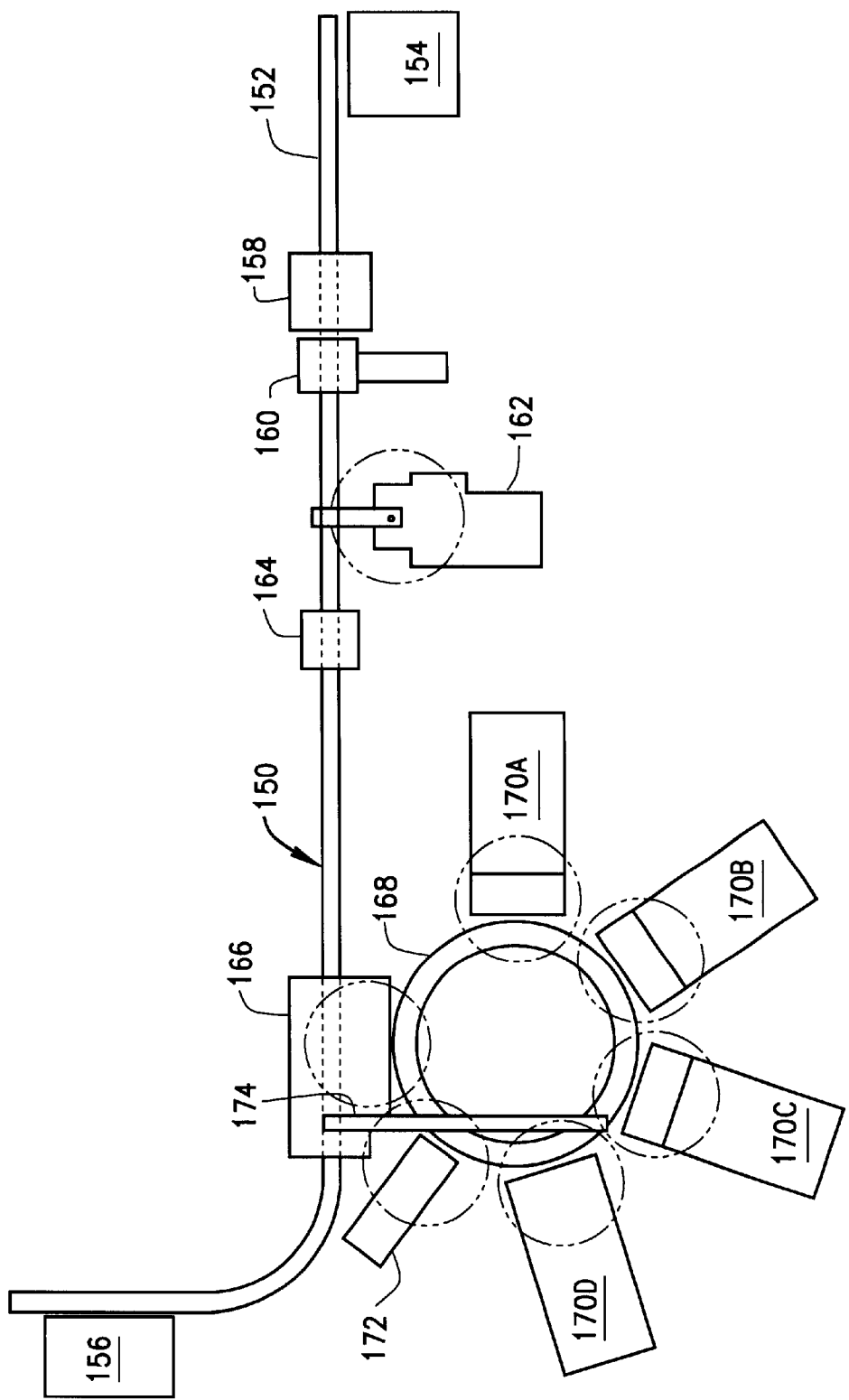
FIG. 7 is a block diagram depiction of an automated coil injection system for injecting stator coils into stator cores for multi-speed motors.

FIG. 7 illustrates one embodiment of a fully automated coil injection system in block diagram form. System 150 includes a first conveyor 152 which extends between a first pallet 154 for stator cores (not shown) and a second pallet 156 for storing "loaded" or "wound" stator cores subsequent to the coil injection. The laminations forming the core are compressed at a core compression station 158 to ensure that there are no gaps between laminations forming such cores. A core check and reject station 160 is provided to ensure that the slots and teeth of each core are properly aligned. The core insulation is loaded into the stator slots at a slot insulation injection station 162. The insulation is then checked at a slot insulation check and reject station 164. The coils are injected into the stator core at a coil injection station 166. Once the coil groups are injected into the core, the "loaded" stator core then travels along conveyor 152 to second pallet 156, where the "loaded" stator cores are removed from conveyor 152 onto second pallet 156.

A closed loop conveyor 168 is provided for supplying injection devices to station 166. Conveyor 168 operates to move injection devices in a generally clockwise direction. Winding stations 170A–D are located at spaced locations along closed loop conveyor 168. A wedge maker 172 also is provided along closed loop conveyor 168, just prior to injection station 166. Winding stations 170A–D and wedge maker 172 are well known in the art and are commercially available, for example, from Advance Machine and Tool Corp., Fort Wayne, Ind. and Statomat Special Machines Inc., Charlotte, N. C.

A stripper guide chute 174 extends from injection station 166 to a location between winding stations 170C and 170D. Chute 174 has a substantially u-shape cross sectional shape with the open end of shoot 174 fading upward. Automated "pick and place" machines (not shown), which are well known, are located at both ends of stripper guide shoot 172.

With respect to the process for loading injection device 68 with the coil groups, and with initial reference to injection station 166, an empty or "unloaded" injection tool 68 travels on closed loop conveyor 168 to first coil winding station 170A. Second stripper 80 is already contained within the lower section of the circular array of blades 72. However, first stripper 50 is located in chute 174 between winding stations 170C and 170D. First coil group 100 is formed at winding station 170A and loaded onto blades 72 of the injection tooling. Injection device 68 then travels on conveyor 168 to winding stations 170B or 170C. The second coil groups 98 are formed at stations 170B or 170C and loaded onto blades 72 of the coil injection device, but axially above second stripper 82. Both stations 170B and 170C are used to form second coil groups in order to reduce the overall time required to load a series of injection devices 68.

After the second coil group 98 has been loaded into the blades 72, the stripper 50 is loaded onto the tooling. More specifically, a conventional pick and place machine (not shown) picks first stripper 50 from stripper guide chute 174 and places the stripper 50 into the interior of the blades 72, on top of second stripper 82, as hereinbefore described. weight member 62, helps assure that stripper 50 will depend vertically from the pick and place gripper and, in effect, "fall" into the tooling. The length of weight number 62 is at least equal to the column height of second and third coil groups 98 and 100 so that injection disk 52 is axially above such coil groups. To facilitate assuring that disk 52 is axially above the coil groups as described above, and prior to loading stripper 50 into the tooling, the second and third coil groups 98 and 10) may be compressed on second stripper 82 at a compressor station (not shown). For example, the compressor station may include a compression disk having a diameter smaller than the diameter of the bore defined by the circular array of blades 72. The compression disk may be inserted, at the compression station, within the tool bore and press the second and third coil groups axially downward toward second stripper 82. The compression disk may then be withdrawn from the bore, and injection device 68 is now ready to have stripper 50 loaded therein as described above.

Injection device 68 then proceeds, on conveyor 168, to winding station 170D where first coil group 96 is loaded onto blades 72 and axially above coil injection disk 52 of first stripper 50. Injection device 68 then moves, on conveyor 168, to wedge maker 172 where slot closing insulation wedges are loaded onto device 68. Injection device 68 then travels on conveyor 168 to injection station 166.

At injection station 166, injection device 68 is aligned with a stator core, and coil groups 96, 98 and 100 are injected into the stator core in the manner as hereinbefore described. Once the coils are fully injected into the stator core, the handle of first stripper protrudes above the top of the stator core, whence a pick and place machine (not shown) grips the handle of first stripper 50 and removes first stripper 50 from the stator and the injection device 60. First stripper 50 is then placed by the pick and place machine into stripper guide chute 174 and first stripper 50 slides down guide chute 174 to the end of chute 174 between stations 170C and 170D, ready to be placed in another set of injection tooling.

Figure 8A:
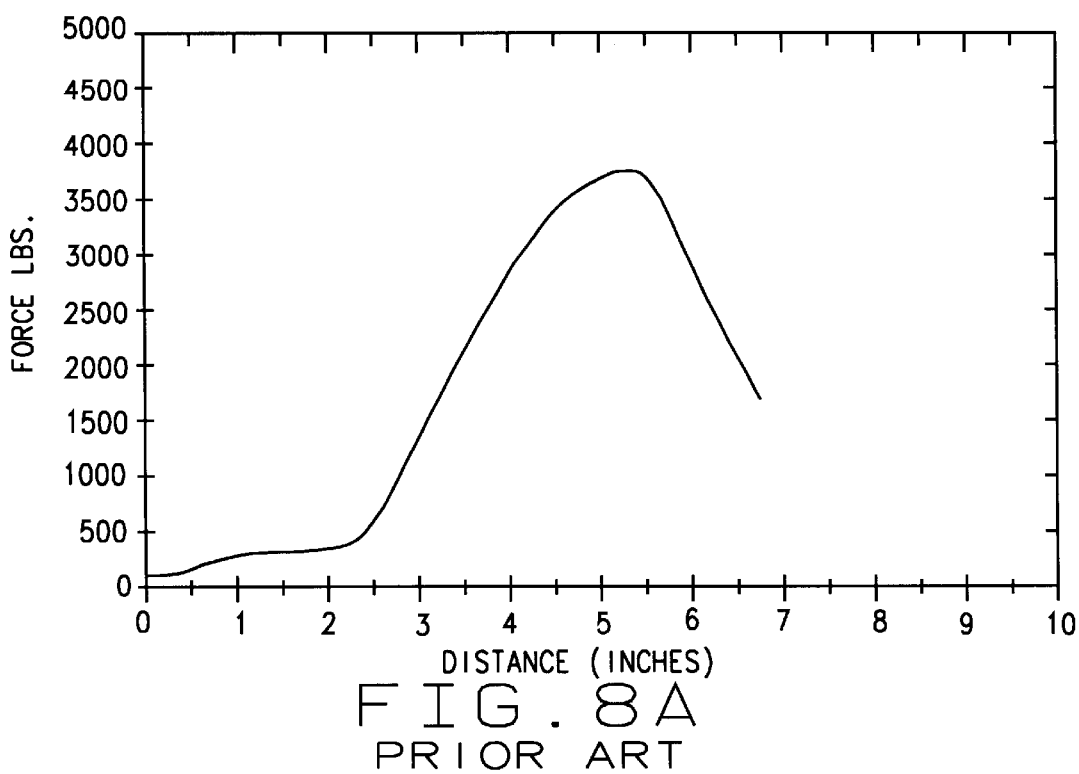
FIGS. 8A and 8B are force-distance diagrams for a known injection process and for an injection process using the arrangement illustrated in FIG. 5.
Figure 8B:
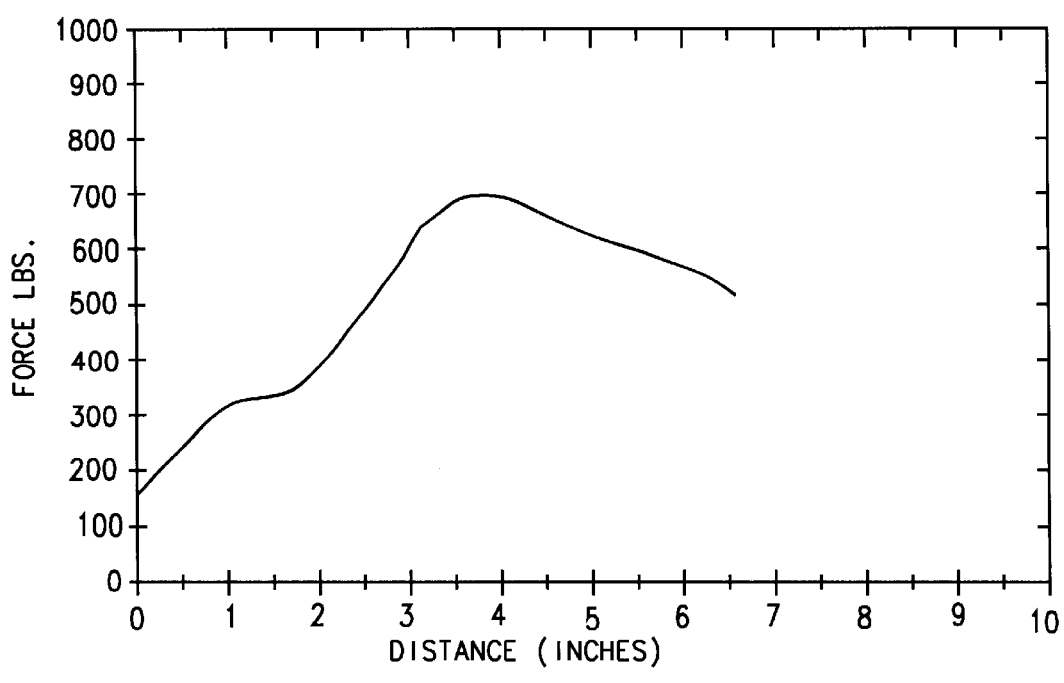

Specifically with respect to the forces required to inject the coils groups into a stator core, FIGS. 8A and 8B are force-distance charts illustrating the forces exerted by the push rod when injecting coil groups with a known stripper assembly and with stripper assembly 78 (FIG. 4), respectively. Particularly, FIG. 8A illustrates the forces exerted by the push rod to move a stripper assembly having a stripper 20 and four leg star 22 as shown in FIG. 1A. The configuration was as follows: stripper 20, four pole start coil group, four leg star 22, six pole main coil group, and four pole main coil group. As shown in FIG. 8A, the magnitude of the force required to perform such injection peaked at about 3700 pounds. Such a high magnitude force can cause damage to the wires forming the stator coils including the formation of pressure marks on such wires. As hereinbefore described, the consequences of formation of such pressure marks is highly undesirable.

FIG. 8B illustrates the forces exerted by the push rod against a stripper assembly including first stripper 50 having a nylon injection disk 52. The configuration was as follows: stripper 20, four pole start coil group, four leg star 22, six pole main coil group, first stripper 50, and four pole main coil group. As shown in FIG. 8B the magnitude of the force required to inject the coil groups into the stator core peaks at less than 700 pounds. This is less than 20 percent as much or at least five times less than the peak magnitude force required to inject the identically configured coil groups using the known stripper assembly referred to in connection with FIG. 8A.

Such a reduction in force is significant particularly with respect to enabling one-pass injection of more than two coil groups into a stator core. In addition, such force reduction may reduce the number and extent of pressure marks formed on the wires of the coils. As explained above, by reducing the number and extent of such pressure marks, the likelihood of field failures is reduced.

Figure 9:
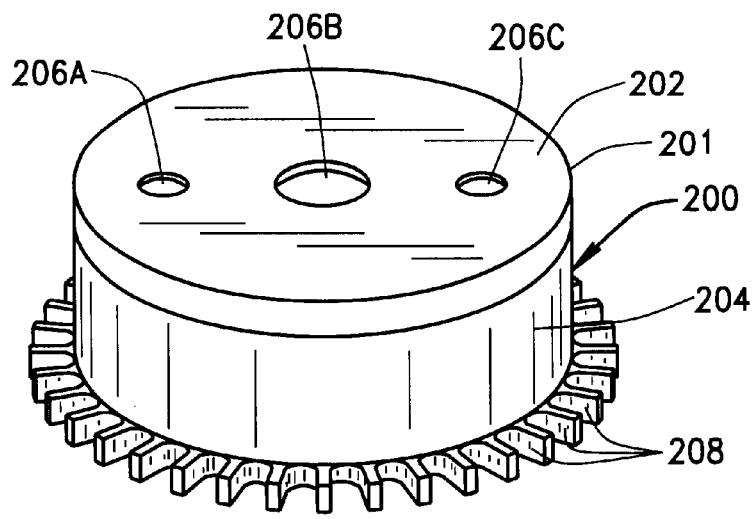
FIG. 9 is a perspective view of an alternative embodiment of a stripper.

FIG. 9 illustrates an alternative embodiment of a stripper 200. Stripper 200 could, for example, be used in assembly 78 in place of second stripper 82 and star 80. Stripper 200 also could be used by itself to inject one, two or even more coil groups into a stator core. Stripper 200 includes an injection disk 202 and a generally cylindrical portion 204. Disk 202 is secured to portion 204 by bolts 206A–C. Fins 208 are formed at a lower section of cylindrical portion 204. Fins 208 are substantially reduced in axial length as compared to the axial length of fins 26 on stripper 20 illustrated in FIG. 1A.

Fins 208 have less contact surface for contacting blades 72 of injection device 68. By reducing such contact surfaces, the amount of friction between fins 206 and blades 72 is believed to be substantially reduced. Such a configuration aides in even further reducing the amount of force required to inject coils into a stator core.

In operation, and as stripper 200 moves through the bore of the injection device toward the stator core, the upper surface of injection disk 202 contacts the segments of the coil groups which extend across the bore of the circular array of blades. Shoulder 201 engages the wire segments as they exit the gaps between the blades 72. Fins 208 contact portions of the coil groups which extend through gaps 76 of adjacent blades 72.

Figure 10:
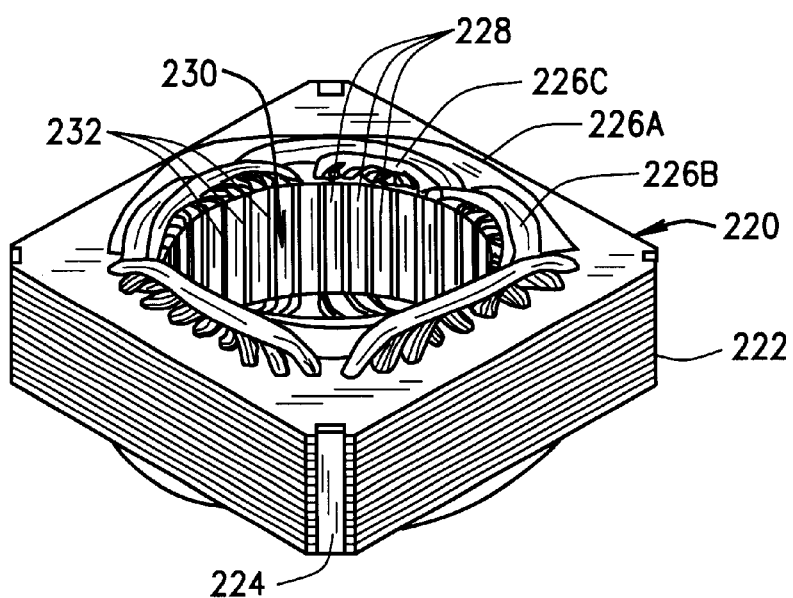
FIG. 10 is a perspective view of a motor stator including a stator core and coils.

FIG. 10 is a perspective view of a stator 220 which includes a stator core 222 formed of a plurality of laminations held together by clips 224 (only one clip 224 is visible in FIG. 10). Coil groups 226A–C have been injected into core 222. More particularly, teeth 228 of core 222 extend radially and define a bore 230. Slots 232 between adjacent teeth 228 extend radially outwardly from bore 230. The ends of teeth 228 and the open ends of slots 232 define the periphery of bore 230. Coil groups 226A–C are inserted into selected slots 232.

From the preceding description of several embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the inventions are to be limited only by the terms of the appended claims.

What is claimed is:

1. A method for injecting, from an injection device, a plurality of coil groups into the core of a dynamoelectric machine, each coil group having one or more coils, the core having a central bore and a plurality of teeth spaced around the bore with a slot between adjacent teeth extending radially outwardly from the bore, the injection device comprising a plurality of gaps defining elongate blades arranged in a circular array, the blades configured to have the coil groups placed thereon such that portions of each of the coils are received in respective gaps between the blades and segments of each of the coils extend across the interior of the circular array of the blades, the device further comprising a stripper assembly movable axially within the circular array of the blades, the stripper assembly comprising a first stripper, the first stripper comprising a substantially circular disk, a first surface of the first stripper configured to contact at least one segment of at least one coil which extends across an interior of the circular array of said blades, the stripper assembly further comprising a second stripper, the second stripper including a first upper surface and plurality of radially spaced fins, each of the fins configured for extending into one of the gaps between adjacent blades, said method comprising the steps of:

inserting the stripper assembly within the injection device such that the first stripper is within the circular array of blades and the second stripper is within the circular array of blades;

loading at least a first coil group on the blades of the injection device at a location axially above the disk of the first stripper; and moving the stripper assembly axially within the circular array of the blades so that the first stripper moves the at least one coil axially along the blades without contacting the portions of the one coil in the gaps between the blades, the first stripper disk having a substantially circular outer periphery defining an outer diameter less than an inner diameter of the circular array of the blades, the substantially circular outer periphery of the first stripper disk in close proximity to the circular array of blades.

2. A method in accordance with claim 1 wherein said method further comprises the steps of aligning each of the blades to register with a respective stator tooth and aligning each of the gaps to register with a respective stator slot.

3. A method in accordance with claim 1 wherein the step of inserting the stripper assembly further comprises the step of inserting the first stripper such that a clearance between the first stripper outer periphery and the circular array of blades is approximately one-half the diameter of a smallest diameter wire included in each coil.

4. A method in accordance with claim 3 wherein after the disk of the first stripper is moved through the bore of the stator core, said method further comprises the step of removing the first stripper from within and in alignment with the circular array of blades.

5. A method of placing windings on the magnetic core of a motor, the method comprising the steps of loading a wire stripper assembly having a first wire stripper including a substantially circular circumferentially extending continuous shoulder and a second wire stripper, into a bore of coil injection tooling in a random angular orientation relative to such tooling; placing turns of wire into gaps established by the tooling such that a clearance between the first wire stripper continuous shoulder and the bore is approximately one-half the diameter of a smallest diameter wire included in the windings; positioning a slotted magnetic core on the tooling with slots of the core aligned with gaps of the tooling; moving the stripper assembly and engaging selected portions of the wire turns with the continuous shoulder within the bore of the tooling and axially moving the wire turns along the tooling and into slots of the core by engaging the wire stripper assembly with only portions of the wire turns positioned within the bore of the tooling.

6. A method of placing windings on the magnetic core of a motor, said method comprising the steps of:

inserting a wire stripper assembly including a first wire stripper having a substantially circular circumferentially extending continuous shoulder and a second wire stripper having a plurality of radially spaced fins into a bore of coil injection tooling in a random angular orientation relative to such tooling, the first wire stripper continuous shoulder sized such that a clearance between the first stripper shoulder and the bore is approximately one-half the diameter of a smallest diameter wire included in the windings; and moving the stripper assembly and engaging portions of the wire turns with the continuous shoulder within the bore of the tooling and moving the wire turns along the tooling and into slots of the core.

7. A method in accordance with claim 6 wherein a weight member extends from the first wire stripper, said method further comprising the steps of:

placing turns of wire into gaps established by the tooling; and positioning a slotted magnetic core on the tooling with slots of the core aligned with gaps of the tooling.

8. A method in accordance with claim 7 wherein said step of moving the stripper assembly further comprises the step of engaging selected portions of the wire turns with the continuous shoulder within the bore of the tooling.

9. A method in accordance with claim 8 wherein said step of moving the stripper assembly further comprises the step of engaging selected portions of the wire turns with the second stripper assembly.

10. A method in accordance with claim 8 further comprising the step of axially moving the wire turns along the tooling into the slots of the core by engaging the wire stripper assembly with only portions of the wire turns positioned within the bore of the tooling.

* * * * *